Oct. 23, 1956  A. E. FAST  2,767,960
APPARATUS FOR DISPENSING HEATED AND COOLED LIQUIDS
Filed Feb. 10, 1955
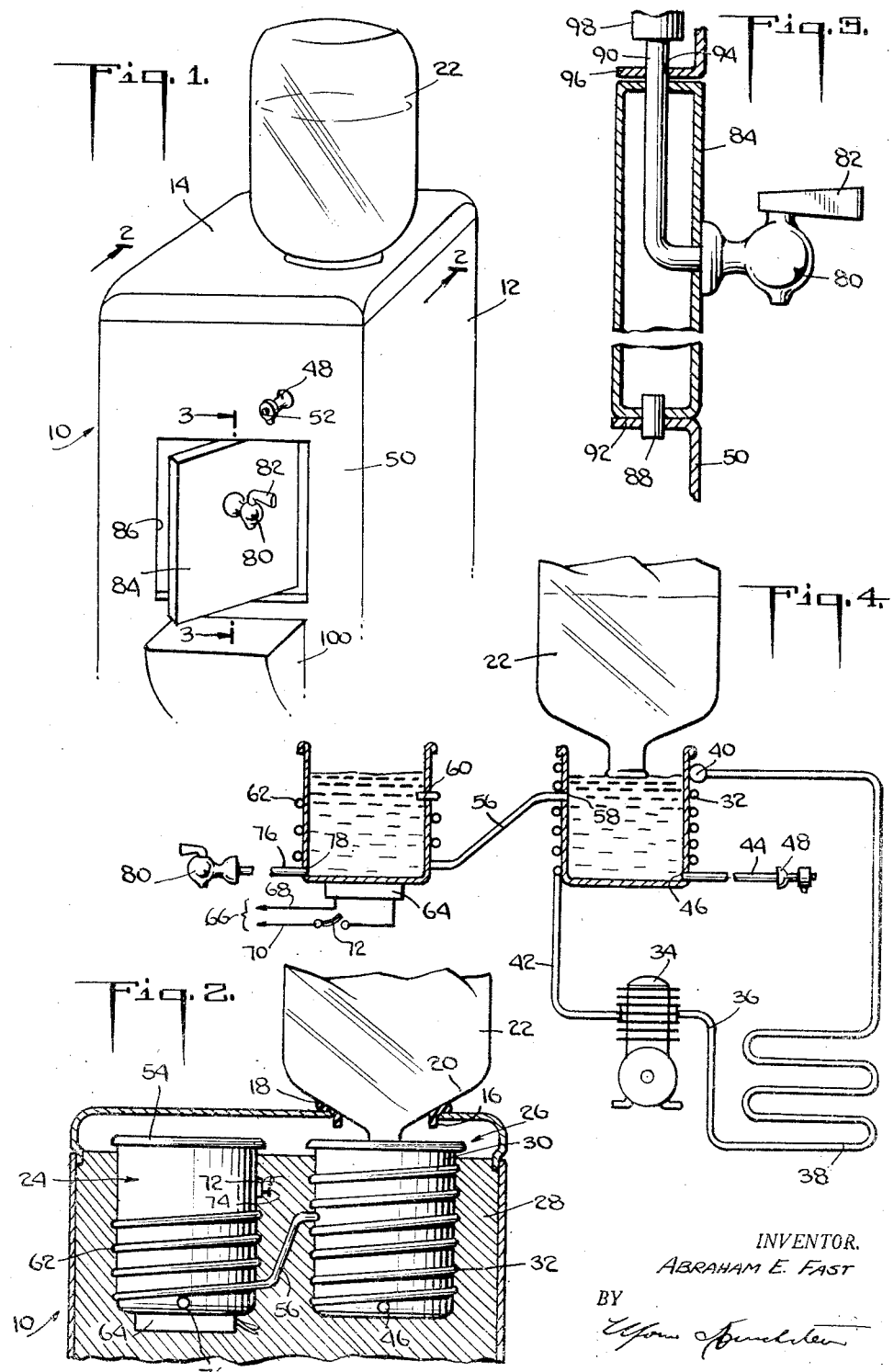
INVENTOR.
ABRAHAM E. FAST
BY
ATTORNEY

United States Patent Office 2,767,960
Patented Oct. 23, 1956

2,767,960

APPARATUS FOR DISPENSING HEATED AND COOLED LIQUIDS

Abraham E. Fast, White Plains, N. Y.

Application February 10, 1955, Serial No. 487,360

9 Claims. (Cl. 257—4)

This invention relates to an apparatus for dispensing heated and cooled liquids.

It is an object of my invention to provide an apparatus of the character described which is of rugged and durable construction, constitutes relatively few and simple parts, is inexpensive to manufacture and easy to service and repair, and fits within the space normally occupied by a conventional cooled water dispenser.

It is another object of my invention to provide an apparatus of the character described which employs a replaceable flask reservoir and has heating and cooling units of large storage capacity compactly arranged therein whereby the apparatus can be made to outwardly resemble a standard water cooler.

It is another object of my invention to provide an apparatus of the character described which has a pair of liquid dispensing spigots at least one of which is permanently at the front of the apparatus, the other spigot being manipulatable between concealed and exposed positions so that with the second spigot concealed, the apparatus appears to be an ordinary water cooler.

It is another object of my invention to provide an apparatus of the character described which has the heating and cooling units so arranged that although a replaceable flask reservoir is employed, liquid fed to the heating unit is not fully chilled to the temperature of the dispensed cooled water whereby the unit is economical in its consumption of electric power.

It is another object of my invention to provide in an apparatus of the character described a heated-liquid spigot which is manually shiftable between a concealed and exposed position.

It is an ancillary object of my invention to provide an apparatus of the character described in which the liquid fed into the heating unit is arranged to be preheated so as to increase the capacity thereof and thereby render the unit capable of delivering comparatively large quantities of hot liquid over a comparatively short period of time.

It is another object of my invention to provide an apparatus of the character described which will deliver both chilled drinking water and piping hot water whose temperature is sufficiently high, e. g., in the neighborhood of 180° F. to prepare hot liquids such as tea, coffee and chocolate without further heating of the beverage or the water on a stove or hotplate.

Other objects of my invention in part will be obvious and in part will be pointed out hereinafter.

My invention accordingly consists in the features of construction, combinations of elements, and arrangements of parts which will be exemplified in the device hereinafter described and of which the scope of application will be indicated in the appended claims.

In the accompanying drawings in which are shown various possible embodiments of my invention, Fig. 1 is a perspective view of an apparatus constructed in accordance with my invention, the hot water spigot being shown between its concealed and its exposed positions;

Fig. 2 is an enlarged sectional view taken substantially along the line 2—2 of Fig. 1;

Fig. 3 is an enlarged fragmentary view taken substantially along the line 3—3 of Fig. 1; and Fig. 4 is a schematic view of the heating and cooling units and the replaceable flask reservoir.

Referring now in detail to the drawings, the reference numeral 10 denotes an apparatus constructed in accordance with my invention. Said apparatus includes a casing 12 of suitable, e. g. rectangular, horizontal cross-section and provided with a conventional, e. g. flat, top 14. Said casing may be of the usual sheet metal construction. The top of the casing is provided with a large aperture 16 lined with a rubber collar 18 that is adapted to engage the shoulder 20 of a replaceable flask reservoir 22 which typically contains water. The neck and mouth of the flask extend downwardly into the interior of the casing in a conventional manner.

A heating unit 24 and a cooling unit 26 are suitably supported within the casing, preferably being imbedded in heat insulating material 28 to prevent warming of the water in the cooling unit and cooling of the water in the heating unit.

The cooling unit 26 includes an open top, closed bottom metal can 30 which is located centrally beneath the aperture 16. The top of the can 30 is slightly above the horizontal level of the mouth of the flask. As is well known, when a flask is inverted over the aperture 16 and its mouth thrust into the can, water will pour out of the flask until the level of the water in the can rises slightly above the mouth of the flask to seal the same and form a lower pressure area above the water in the flask that prevents further outflow of water.

The cooling unit 26 further includes a tubular expansion coil 32 wrapped about the can. A refrigerant compressed in a compressor 34 is led through a conduit 36 to a cooling coil 38 and then to an expansion valve 40 at the entry end of the coil 32. The expanded spent refrigerant gas is returned through a condiut 42 to the compressor.

A pipe 44 runs from an opening 46 adjacent the bottom of the cooling can to a manually operable spigot 48 which is fixedly mounted on the front wall 50 of the casing. As is usual, the spigot includes a manually manipulatable element 52 for controlling flow of cooled water from the spigot. In the spigot 48 illustrated herein, said element is biased to a normally closed position and constitutes a button which when pressed will open the spibot to permit outflow of cooled water. When the button is released, a spring (not shown) biases the button and the valve controlled thereby to closed position in order to cut off flow of cold water.

The heating unit 24, like the cooling unit 26, comprises an open top, closed bottom metal can 54. The top of the can is at a level above the bottom of the mouth of the flask. Conveniently, the top of the heating can is at about the same level as the top of the cooling can 30. The diameter and height of the heating can are determined by the amount of hot water to be kept in storage, and in the preferred form of my invention both the heating and cooling cans are of the same size.

The two cans are located side by side, the insulation 28 between them minimizing flow of heat therebetween. Water is fed from the cooling can to the heating can by gravity and to this end a pipe connection is provided terminating in both cans below the level of the mouth of the flask when the flask is seated on the collar 18.

In accordance with a feature of my invention, I employ a connecting pipe 56 whose entry end 58 at the cooling can is near the upper level of water in said can, that is to say, only slightly below the level of the mouth of the flask. In this manner, I am able to withdraw water from the cooling can which has not been excessively cooled to the extent required for drinking purposes, particularly when the apparatus 10 is in active use, for instance during the morning and afternoon breaks and the luncheon period.

Said pipe 56 has its exit end 60 comparatively high in the heating can so that the relatively cool water delivered to the heating can is remote from the point of withdrawal of hot water and thereby avoids a short circuit flow of the cool water to the hot water spigot. Furthermore, the connecting pipe 56 is shaped to provide a helical coil 62 that is wrapped about the heating can in good heat conducting relationship therewith. Accordingly, as water flows from the cooling can to the heating can, it is preheated by the already heated water in the hot water can. This arrangement has the further advantage of minimizing back flow of heated water to the cooling can.

The heating can is heated electrically, as by a hotplate 64 fixed to the bottom wall of the can. The hotplate is energized from a source 66 of electric power by means of lead wires 68, 70, one of which includes a thermostat 72 series-connected therein. The thermostat is suitably located to be responsive to temperature of water within the heating can. Desirably, said thermostat is located near the exit end 60 of the connecting pipe so that when water is withdrawn from the heating can and fresh cool water flows therein the thermostat will quickly respond to influx of such water and there will be no delay in energization of the hotplate.

The thermostat includes an adjusting screw 74 for selectively setting the temperature at which water in the heating unit is maintained. I have found that in an apparatus of the character described where the two units 24, 26, although close by, are separated by insulation 28 the temperature of the water in the heating unit can be maintained sufficiently high, e. g. as high as 180° F., for making hot beverages such as tea, coffee and cocoa without noticeably raising the temperature of the cooled water in the cooling unit or requiring a noticeably greater amount of power for chilling the water. The preheating coil 62 aids considerably in this respect by furnishing a region surrounding the heating unit in which there is a steep temperature gradient. Moreover, the heat lost from the high temperature body of water is largely recaptured in the preheating coil so that in addition to maintaining a low power consumption for the refrigeration unit, the preheating coil enables water to be heated piping hot economically.

A pipe 76 runs from an opening 78 near the bottom of the heating tank to a hot water spigot 80 at the front of the casing 12.

Like the cold water spigot 48 the hot water spigot includes suitable means such as a handle 82 for controlling flow of water therethrough.

In accordance with an ancillary feature of my invention, the hot water spigot is so mounted and connected to the heating unit that it can be selectively disposed in either an exposed operable position or in a concealed idle position. To this end the spigot 80 is carried by a panel 84 set flush into an opening 86 in the exterior surface of the front wall 50. The panel 84 is revolvable about a vertical axis located at the center of the opening, being supported for rotation by a bottom trunnion 88 and a top trunnion 90. The bottom trunnion simply consists of a stub axle fastened to a flange 92 inturned from the lower edge of the opening 86 and on which the panel 84 revolves. The upper trunnion 90 constitutes a portion of the hot water pipe 76. Said portion is fixed to the panel 84 and is revolvable in an opening 94 in a flange 96 inturned from the upper edge of the opening 86. To permit this portion 90 of the hot water pipe to function as a trunnion a rotatable joint 98 is included in the pipe thus permitting the part of the pipe above the joint to remain stationary while the portion 90 of the pipe below the joint can turn with respect thereto.

Both the hot and cold water spigots are located at approximately waist level and are disposed above a catch basin 100 mounted on the front wall 50 of the casing. The spigots are disaligned transversely to provide a clear space between each spigot and the catch basin.

It thus will be seen that I have provided a device which achieves the several objects of my invention and is well adapted to meet the conditions of practical use.

As various possible embodiments might be made of the invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An apparatus of the character described comprising a casing, a cooling unit including an open top cooling can located within the casing, a heating unit including an open top heating can located within the casing at substantially the same level as the cooling can, heat insulation between said cans, electrically operable compression refrigeration means within the casing, said means including an expansion coil in contact with the cooling can, electrically operable resistance heating means in contact with the heating can, an aperture in top of the casing above the cooling can for reception of the shoulder of an inverted water flask, the top of the cooling can being located above the level of the mouth of the inverted flask, a connecting coil having an entry end in the cooling can below the level of the mouth of the inverted flask and an exit end at a high level in the heating can, a hot water spigot at the front wall of the casing, a cold water spigot at the front wall of the casing, conduit means connecting the cooling can with the cold water spigot, and conduit means connecting the heating can with the hot water spigot.

2. An apparatus of the character described comprising a casing, a cooling unit including an open top cooling can located within the casing, a heating unit including an open top heating can located within the casing at substantially the same level as the cooling can, heat insulation between said cans, electrically operable compression refrigeration means within the casing, said means including an expansion coil in contact with the cooling can, electrically operable resistance heating means in contact with the heating can, an aperture in top of the casing above the cooling can for reception of the shoulder of an inverted water flask, the top of the cooling can being located above the level of the mouth of the inverted flask, a connecting coil having an entry end at a high level in the cooling can and an exit end at a high level in the heating can, a hot water spigot at the front wall of the casing, a cold water spigot at the front wall of the casing, conduit means connecting the cooling can with the cold water spigot, and conduit means connecting the heating can with the hot water spigot.

3. An apparatus of the character described comprising a casing, a cooling unit including an open top cooling can located within the casing, a heating unit including an open top heating can located within the casing at substantially the same level as the cooling can, heat insulation between said cans, electrically operable compression refrigeration means within the casing, said means including an expansion coil in contact with the cooling can, electrically operable resistance heating means in contact with the heating can, an aperture in top of the casing above the cooling can for reception of the shoulder of an inverted water flask, the top of the cooling can being located above the level of the mouth of the inverted flask, a connecting coil having an entry end at a high level in the cooling can and an exit end at a high level in the heating can, an intermediate portion of said connecting coil surrounding the heating can in contact therewith, a hot water spigot at the front wall of the casing, a cold water spigot at the front wall of the casing, conduit means connecting the cooling can with the cold water spigot, and conduit means connecting the heating can with the hot water spigot.

4. An apparatus of the character described comprising a casing, a cooling unit including an open top cooling can located within the casing, a heatng unit including an open top heating can located within the casing at substantially the same level as the cooling can, heat insulation between said cans, electrically operable compression refrigeration means within the casing, said means including an expansion coil in contact with the cooling can, electrically operable resistance heating means in contact with the heating can, said heating means including an adjustable thermostat, an aperture in top of the casing above the cooling can for reception of the shoulder of an inverted water flask, the top of the cooling can being located above the level of the mouth of the inverted flask, a connecting coil having an entry end at a high level in the cooling can and an exit end at a high level in the heating can, an intermediate portion of said connecting coil surrounding the heating can in contact therewith, the thermostat being at approximately the level of the exit end, a hot water spigot at the front wall of the casing, a cold water spigot at the front wall of the casing, conduit means connecting the cooling can with the cold water spigot, and conduit means connecting the heating can with the hot water spigot.

5. An apparatus of the character described comprising a casing, a cooling unit including an open top cooling can located within the casing, a heating unit including an open top heating can located within the casing at substantially the same level as the cooling can, heat insulation between said cans, electrically operable compression refrigeration means within the casing, said means including an expansion coil in contact with the cooling can, electrically operable resistance heating means in contact with the heating can, an aperture in top of the casing above the cooling can for reception of the shoulder of an inverted water flask, the top of the cooling can being located above the level of the mouth of the inverted flask, a connecting coil having an entry end at a high level in the cooling can and an exit end at a high level in the heating can, a cold water spigot permanently mounted on the front wall of the casing, conduit means connecting the cooling can with the cold water spigot, said casing having an opening in its front wall, a panel in said opening, means mounting said panel in said opening for revolution about an axis, a hot water spigot mounted on said panel, and conduit means connecting the heating can with the hot water spigot, said conduit means passing through the mounting means for the panel and including a rotary joint whereby to permit the hot water spigot to be moved between an exposed operating position extending from the front wall of the casing and a concealed idle position located in back of the front wall of the casing.

6. An apparatus of the character described comprising a casing, a cooling unit including a cooling can located within the casing, a heating unit including a heating can located within the casing, electrically operable compression refrigeration means within the casing, said means including an expansion coil in contact with the cooling can, electrically operable resistance heating means in contact with the heating can, heat insulation between said cans, a water supply conduit for the cooling can, a connecting coil having an entry end in the cooling can and an exit end in the heating can, a hot water spigot at the front wall of the casing, a cold water spigot at the front wall of the casing, conduit means connecting the cooling can with the cold water spigot and conduit means connecting the heating can with the hot water spigot.

7. An apparatus as set forth in claim 6 wherein the exit end of the connecting coil is at a high level in the heating can and the entry end is at a high level in the cooling can.

8. An apparatus as set forth in claim 7 wherein the connecting coil includes an intermediate portion surrounding the heating can in contact therewith.

9. An apparatus of the character described comprising a casing, a cooling unit including an open top cooling can located within the casing, a heating unit including a top vented heating can located within the casing, heat insulation between said cans, electrically operable compression refrigeration means within the casing, said means including an expansion coil in contact with the cooling can, electrically operable resistance heating means in contact with the heating can, an aperture in top of the casing above the cooling can for reception of the shoulder of an inverted water flask, the top of the cooling can being located above the level of the mouth of the inverted flask, a connecting coil having an entry end in the cooling can below the level of the mouth of the inverted flask and an exit end at a high level in the heating can, a hot water spigot at the front wall of the casing, a cold water spigot at the front wall of the casing, conduit means connecting the cooling can with the cold water spigot, and conduit means connecting the heating can with the hot water spigot.

References Cited in the file of this patent
UNITED STATES PATENTS

| | | |
|---|---|---|
| 174,810 | Hannum | Mar. 14, 1876 |
| 441,628 | Coon et al. | Nov. 25, 1890 |
| 806,697 | Morse | Dec. 5, 1905 |
| 2,078,097 | Radzinsky | Apr. 20, 1937 |
| 2,359,791 | Ralston | Oct. 10, 1944 |